United States Patent
Rapp et al.

(10) Patent No.: US 7,199,494 B2
(45) Date of Patent: Apr. 3, 2007

(54) ELECTRIC LINEAR ACTUATOR

(75) Inventors: Martin Rapp, Kernen (DE); Thomas Feyrer, Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 11/050,106

(22) Filed: Feb. 3, 2005

(65) Prior Publication Data

US 2005/0179325 A1    Aug. 18, 2005

(30) Foreign Application Priority Data

Feb. 7, 2004    (EP)    ................... 04002750

(51) Int. Cl.
*H02K 7/06*    (2006.01)
*B23Q 1/58*    (2006.01)
(52) U.S. Cl. .................. 310/20; 310/17; 310/75 R; 310/80
(58) Field of Classification Search .............. 310/20, 310/80
See application file for complete search history.

(56) References Cited

U.S. PATENT DOCUMENTS

| 4,288,182 A | | 9/1981 | Vandenkieboom et al. |
| 4,607,180 A | * | 8/1986 | Stoody .................. 310/80 |
| 4,947,070 A | * | 8/1990 | Hill et al. ............... 310/80 |
| 5,273,381 A | * | 12/1993 | Shirai .................... 409/219 |
| 5,676,016 A | | 10/1997 | Nagai et al. |
| 6,101,889 A | * | 8/2000 | Laskey ................... 74/89.23 |
| 6,174,102 B1 | * | 1/2001 | Do et al. ................ 403/381 |
| 6,240,796 B1 | * | 6/2001 | Yamada .................. 74/89.23 |
| 6,400,047 B1 | * | 6/2002 | Hartramph et al. ...... 310/12 |
| 6,724,112 B2 | * | 4/2004 | Chihara et al. .......... 310/89 |
| 6,756,707 B2 | * | 6/2004 | Hochhalter et al. ...... 310/20 |

FOREIGN PATENT DOCUMENTS

| DE | 10009713 | * | 9/2001 |
| EP | 106244 A1 | * | 4/1984 |
| EP | 647503 A2 | * | 4/1995 |
| EP | 0726 118 A1 | | 8/1996 |
| GB | 2060445 A | * | 5/1981 |
| GB | 2092702 A | * | 8/1982 |

* cited by examiner

*Primary Examiner*—Burton Mullins
(74) *Attorney, Agent, or Firm*—Hoffman & Baron, LLP

(57) ABSTRACT

The invention proposes an electric linear actuator with a take-off element (12) that is adjustably supported on a main housing (5) and is connected to and driven by an electric motor (14) via a spindle drive (8). This connection is realized in the form of a purely plug-type coupling (41) that is formed by a gear transmission (43). The gear transmission (43) comprises a first transmission gear (44) that forms part of the spindle drive (8) and a second transmission gear (45) that together with the electric motor (14) forms part of a motor module (3). When the motor module (3) is attached or removed, the teeth of the gear transmission (43) are disengaged or disengaged automatically.

17 Claims, 5 Drawing Sheets

ELECTRIC LINEAR ACTUATOR

FIELD OF THE INVENTION

The invention pertains to an electric linear actuator with a main housing, in which a take-off element for picking off a linear motion is supported in a linearly adjustable fashion, wherein said take-off element is coupled to and driven by the output part of a spindle drive arranged in the main housing, and wherein the rotatable input part of said spindle drive is connected to and driven by an electric motor, arranged on the rear side of the main housing, via a coupling.

BACKGROUND OF THE INVENTION

An electric linear actuator of this type is known from U.S. Pat. No. 5,676,016 and comprises a main housing with a spindle drive accommodated therein, the spindle drive being coupled to a take-off element that is realized in a slide-like fashion. When the spindle-form input part of the spindle drive is set in rotation, the output part of the spindle drive carries out a linear motion that can be taken off on the take-off element. The rotation of the input part is realized with an electric motor that is arranged on the rear side of the main housing, and the driven part of which is connected in a torsionally rigid fashion to the input part of the spindle drive by means of a coupling.

The known linear actuator can be expediently assembled only by installing the electric motor together with the spindle drive that was previously mounted on it. This applies accordingly to removal in case of required repairs, since the coupling is not easily accessible in order to remove the transverse pins that ensure that the arrangement is held together axially.

SUMMARY OF THE INVENTION

Consequently, the present invention is based on the objective of developing an electric linear actuator of the initially described type that can be more easily installed and removed.

This objective is attained in that the coupling consists of a purely plug-type coupling that is realized in the form of a gear transmission comprising a first transmission gear that is connected in a torsionally rigid fashion to the input part of the spindle drive and mounted in a fixed position relative to the main housing, as well as a second transmission gear that is connected to the driven part of the electric motor, wherein the second transmission gear forms part of a motor module together with the electric motor, and wherein the motor module can be attached to and removed from the rear side of the main housing independently of the instantaneous relative position between the input part and the output part of the spindle drive, such that the teeth of the two transmission gears are simultaneously engaged or disengaged automatically.

This makes it possible to install and remove the electric motor independently of the spindle drive. Since the coupling is realized in the form of a purely plug-type coupling, it is not required for elements to be coupled to be mutually locked together. Consequently, the coupling is automatically engaged or disengaged, respectively, when the motor module comprising the electric motor is detached or removed. This is advantageous not only with respect to initial installation but also for periodic servicing. The simple installation and removal option also proves advantageous in instances in which the linear actuator needs to be refitted to a different power output or a different gear transmission ratio. In addition, the design of the plug-type coupling in the form of a gear transmission makes it possible, if so required, to reduced the structural length required for the coupling means, since the engaged transmission gears can be arranged adjacent to one another transverse to the longitudinal axis of the linear actuator.

It is advantageous to realize both transmission gears in the form of cylindrical gears that are toothed on the outer periphery and arranged offset to one another in a parallel fashion, wherein the axes of rotation of said cylindrical gears are aligned with the direction of an imaginary installation axis along which the motor unit is displaced during its attachment to or removal from the main housing. Due to these measures, the two gears are directly engaged and disengaged in a particularly simple fashion during the installation and removal process, respectively. Although it would be possible, in principle, to realize the cylindrical gears with a helical gearing, it is particularly advantageous for the cylindrical gears to be provided with peripheral spur gearing.

In order to automatically adjust the correct position during installation of the motor module, it is advantageous to provide the main housing and the motor module with complementary plug-type centering means. These centering means are engaged when the motor module is attached to the main housing.

In order to allow a very fast installation and removal of the motor module, if so required, the motor module is preferably fixed on the main housing merely by one or more mounting screws in the attached state. The motor module can be easily pulled off the main housing once the mounting screws are loosened.

The electric motor can be placed in a module housing of the motor module as a unit. In particular, the electric motor is installed in a detachable fashion such that it can be replaced on demand, for example, in case of a defect or when refitting to a different motor power.

In the context of the invention, it would be possible to provide several motor modules that differ with respect to the speed that can be taken off at the second transmission gear, wherein these motor modules can be selectively installed on a main housing in order to drive the spindle drive with different speeds, according to the respective application. In this case, it would be possible, for example, to equip several motor modules with different electric motors. According to a significantly simpler solution, identical electric motors are used and an intermediate step-down or step-up gear is provided between the electric motor and the second transmission gear. If designed appropriately, the respective intermediate gear converts the speed of the electric motor to the desired speed of the second transmission gear. The intermediate gear is realized, in particular, in the form of a planetary gear.

The main housing, the take-off element and the spindle drive may be combined into a working unit, wherein the spindle drive is realized in the form of a module that is removably fixed in a receptacle of the main housing. This means that the spindle drive can be installed and removed as a unit. This not only simplifies repair procedures, but also allows a simple refitting of the linear actuator, for example, to different thread pitches or two different types of spindle drive. This makes it possible, for example, to selectively utilize a ball screw or a sliding screw.

If so required, the motor module may be equipped with an encoder that evaluates the rotary motion of the electric motor and consequently can be utilized as a quasi-positionmeasuring system for determining the position of the linearly adjustable take-off element.

The invention is described in greater detail below with reference to the enclosed figures.

DETAILED DESCRIPTION OF THE PREFERRED EMBODIMENTS

Figure 1:
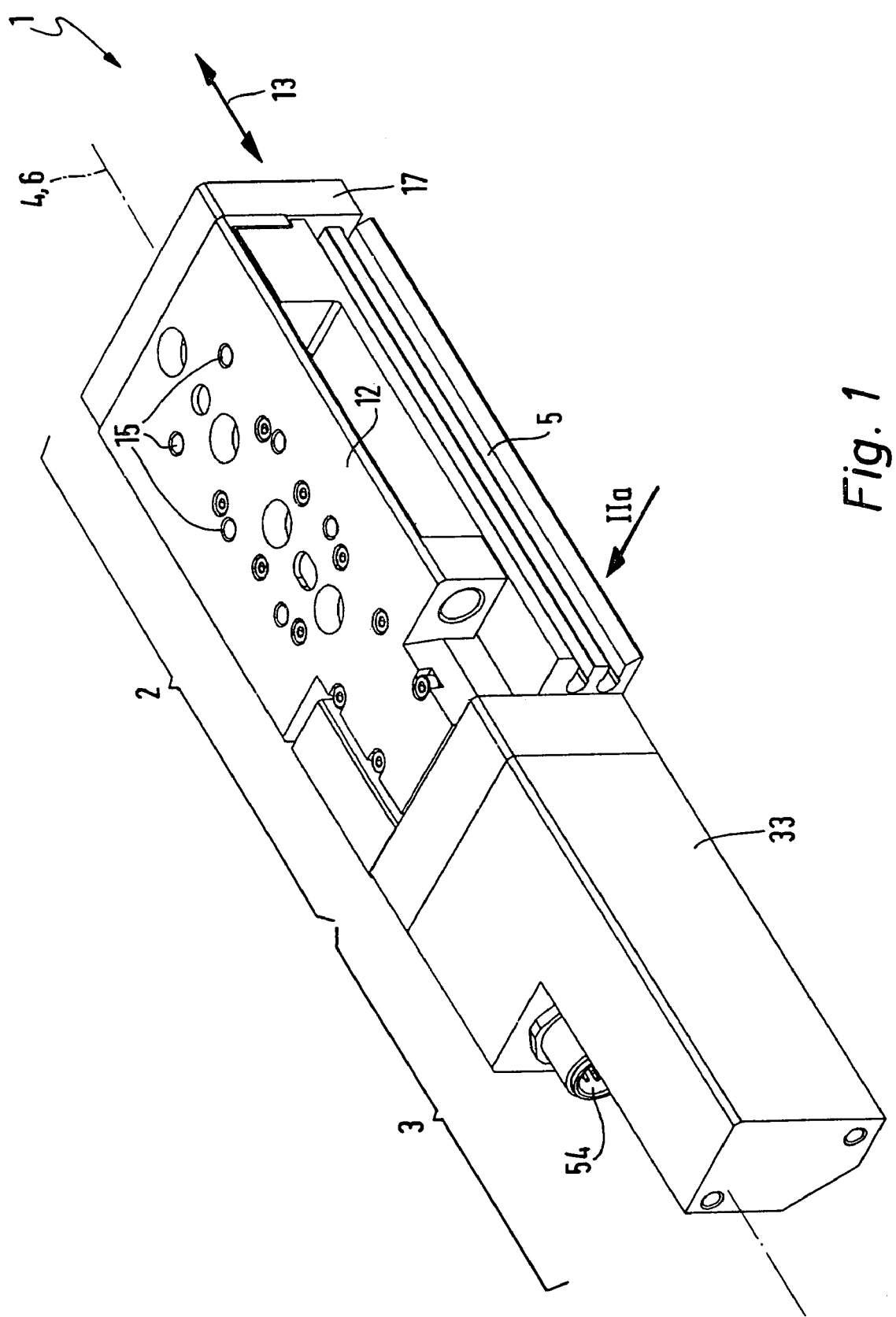
FIG. 1, an oblique view of one preferred embodiment of the electric linear actuator according to the invention.

The electric linear actuator shown is identified as a whole by the reference symbol 1 and comprises a working unit 2 as well as a motor module 3 that is removably coupled thereto. These two components are arranged successively in the direction of an imaginary installation axis 4 that is indicated with dot-dash lines. The latter simultaneously forms the longitudinal axis of the linear actuator 1.

The working unit 2 has an elongated housing that is referred to as the main housing 5, and the longitudinal axis 6 of which coincides with the installation axis 4. A spindle drive 8 is replacably accommodated in a receptacle 7 that extends through the main housing 5 in the longitudinal direction. A take-off element 12 is supported on the outside of the main housing 5 in a linearly adjustable fashion such that it is able to carry out a linear back and forward motion 13 relative to the main housing 5, as indicated by a double arrow. The travel direction extends in the same direction as the longitudinal axis 6.

The motor module 3 is attached to the rear side of the main housing 5 and contains an electric motor 14 that is functionally connected to the take-off element 12 via the spindle drive 8. The rotary motion generated by the electric motor 14 is converted into the desired linear motion 13 of the driven part 12 in this fashion.

Mounting means 15 of arbitrary design are provided on the take-off element 12 in order to attach arbitrary components to be linearly adjusted, for example, part of a machine or a gripper used for manipulation tasks.

The take-off element 12 is realized in a slide-like fashion in the embodiment shown, and is supported on the main housing 5 such that it can be longitudinally displaced by means of suitable linear guide means 16 arranged in between. A yoke section 17 of the take-off element 12 projects in front of the front face 18 of the main housing 5 into a region situated in front of the front opening 22 of the receptacle 7 provided at this location.

The spindle drive 8 comprises two bearing parts, namely front and rear bearing parts 23a, 23b that are spaced apart from one another and fixed in the interior of the receptacle 7, with the front bearing part 23a being positioned in the vicinity of the front opening 22 and the rear bearing part 23b being positioned in the vicinity of the rear opening 25 of the receptacle 7 that opens toward the rear face 24 of the main housing 5. The rod-like input part 26 of the spindle drive 8 is realized in the form of a threaded spindle and extends between the two bearings parts 23a, 23b, with input part 26 being supported in a rotatable fashion in the two respective bearing parts 23a, 23b. Appropriate design of at least one bearing part ensures that the input part 26 is fixed so that it cannot be moved in the longitudinal direction.

An output part 27 of the spindle drive that is realized in the form of a nut is situated on the spindle-like input part 26 and coupled in an axially movable fashion to the yoke section 17 by means of at least one axially extending coupling element 28 that protrudes from the main housing 5 in the region of the front opening 22. The output part 27 is fixed in a torsionally rigid fashion, for example, by means of an appropriate connection with the yoke section 17 and is engaged with the input part 26. Consequently, a rotation of the input part 26 in the chosen direction of rotation results in a linear motion of the output part 27 relative to the input part 26 in the corresponding direction. Due to the described motive coupling, this results in the above-described linear motion 13 of the take-off element 12.

The motor module 3 is attached to the rear face 24 of the main housing 5 of the working unit 2 with a frontal installation surface 32. The installation surface 32 is situated in a housing of the motor module 3 that is referred to as the module housing 33 and in which the electric motor 14 is accommodated, in particular in the form of a cartridge. The installation of the motor module 3 on the main housing 5 is realized by attaching the motor module in the direction of the installation axis 4 as part of an installation motion 34 indicated by an arrow. The removal of the motor module 3 from the main housing 5 takes place in the opposite direction.

Figure 2:
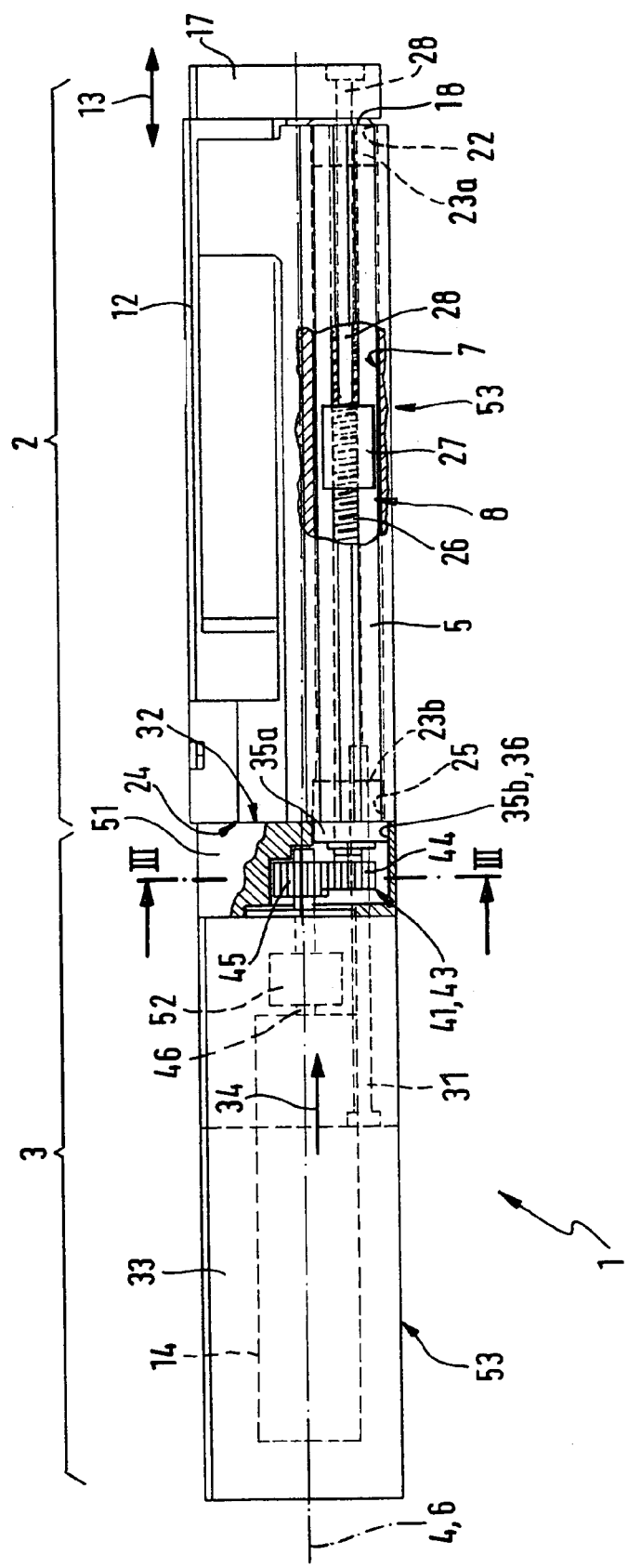
FIG. 2a, a side view, in the direction of the arrow IIa, of an alternative embodiment of the linear actuator shown in FIG. 1 wherein the region of the plug-type coupling is illustrated.
Figure 2A:
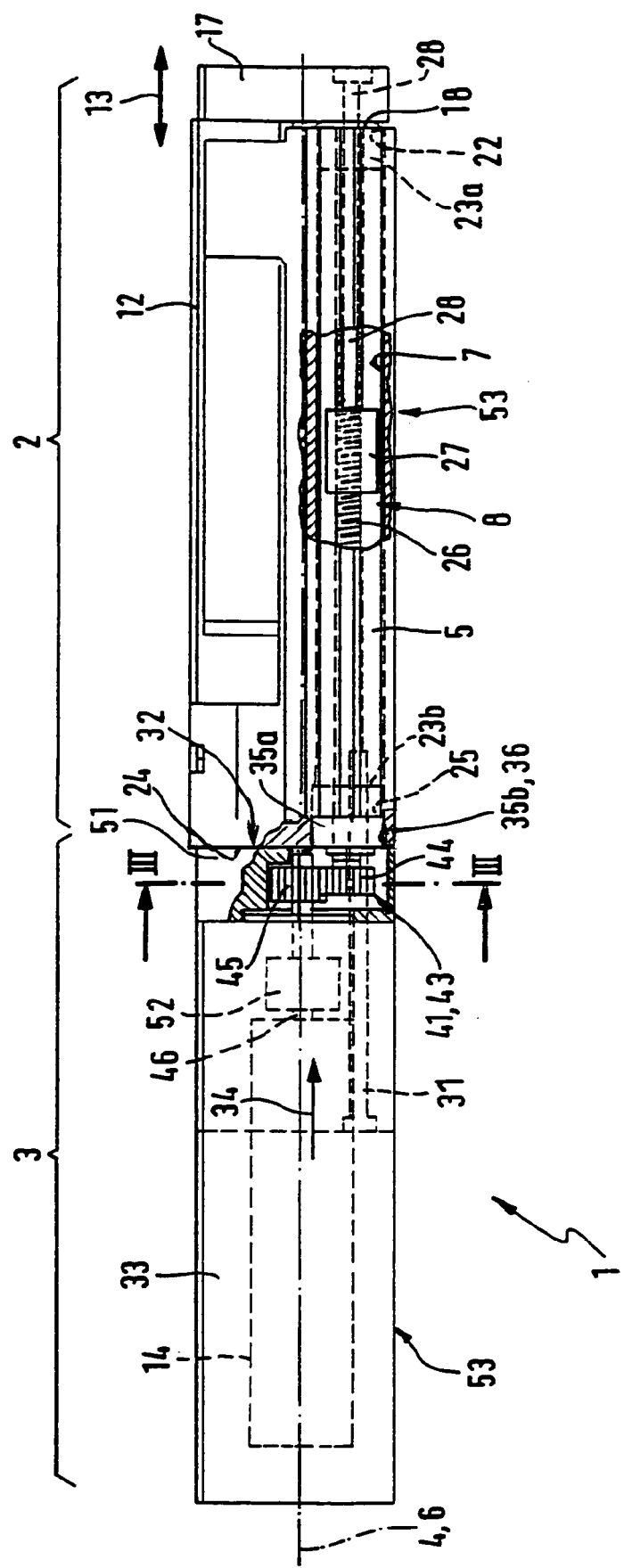

The installation of the motor module 3 on the main housing 5 is effected as a plug-type maneuver. During this plug-type maneuver, complementary first and second plug-type centering means 35a, 35b are positively engaged transverse to the installation axis 4, as shown in FIGS. 2 and 2a. This defines the relative position between the main housing 5 and the motor module 3 transverse to the longitudinal axis 6 of the main housing 5.

The first plug-type centering means 35a assigned to the main housing 5 is preferably formed by a section of the rear bearing part 23b that projects beyond the rear face 24 of the main housing 5. At least part of this section has an essentially cylindrical outside contour that can be fitted into a complementary recess 36 of the module housing 33 that is open toward the installation surface 32 and represents the second plug-type centering means 35b.

In the described embodiment, at least the rear bearing part 23b is screwed into the receptacle 7. In order to allow the convenient application of a screwdriver, the peripheral surface of the section of the rear bearing part 23b that projects beyond the main housing 5 is provided with respective flats 37 at diametrically opposite points. It would also be a conceivable to utilize a polygonal contour, for example, in the form of a hexagon.

Once the motor module 3 is attached to the main housing 5, in particular in a plug-type fashion, it is axially fixed in the attached position by means of at least one mounting screw 31 such that it can no longer be removed in the direction of the installation axis 4. The mounting screws 37 consequently have the purpose of ensuring that the main housing 5 and the motor module 3 are held together axially. The motor module 3 can be removed by loosening the mounting screws 37 such that the motor module 3 can be pulled off. The mounting screws 37 may also fulfill the function of preventing the motor module 3 from turning relative to the drive unit 2.

This locking function can usually be achieved with one or two mounting screws 37. Each mounting screw 37 penetrates the module housing 33, against which with its head 38 beams. The mounting screws are removably screwed into a threaded hole 39 of the main housing 5 that opens toward the rear face 24.

The torque coupling between the input part 26 of the spindle drive 8 and the electric motor 14 is realized in the form of a purely plug-type coupling 41. The elements to be coupled can be engaged by means of a simple plug-in process in order to transmit the torque in the desired fashion. This plug-in process is identical to the installation motion 34 of the motor module 3. The coupling is also disengaged automatically when the motor module 3 is removed in the direction of the installation axis 4.

The plug-type coupling 41 is advantageously formed by a gear transmission 43. This gear transmission comprises the first transmission gear 44 that is connected in a torsionally rigid fashion to the input part 26 of the spindle drive 8, as well as a second transmission gear 45 that is coupled to and driven by the rotary driven part 46. The first transmission gear 44 is arranged coaxial to the input part 26 such that its axis of rotation 47 is aligned in the same direction as the installation axis 4. This also applies to the axis of rotation 48 of the second transmission gear 45.

The two transmission gears 44, 45 are preferably realized in the form of so-called spur gears that are toothed on the radially oriented outer periphery. If the axes of rotation 47, 48 are arranged such that they are offset to one another in a parallel fashion, both transmission gears 44, 45 are arranged adjacent to one another at the same level in the direction of the installation axis 4 in the engaged state of the coupling.

Figure 3:
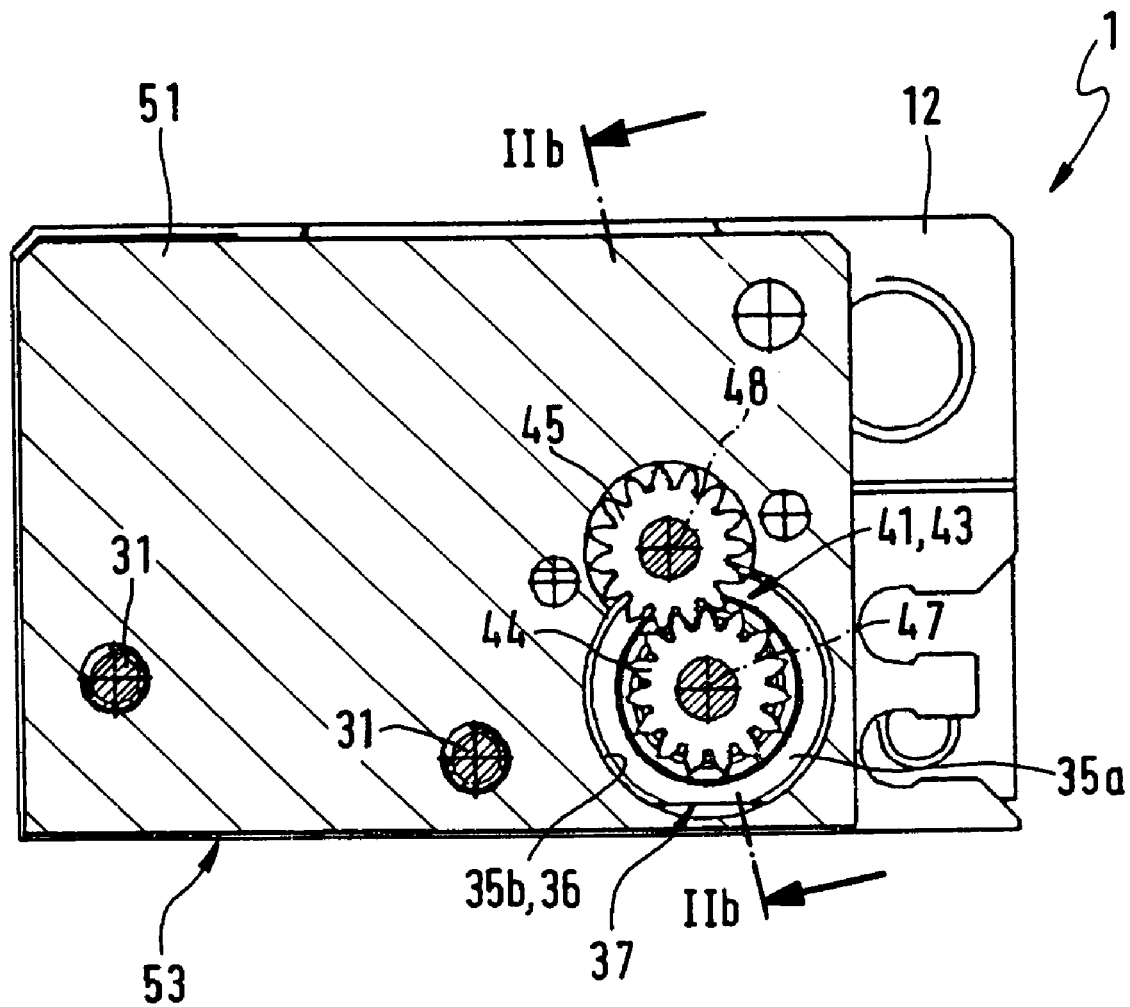
FIG. 3, a cross section through the linear actuator along the line III—III in FIG. 2, and FIG. 4, the linear actuator shown in FIG. 1 in the detached state of the motor module.
Figure 4:
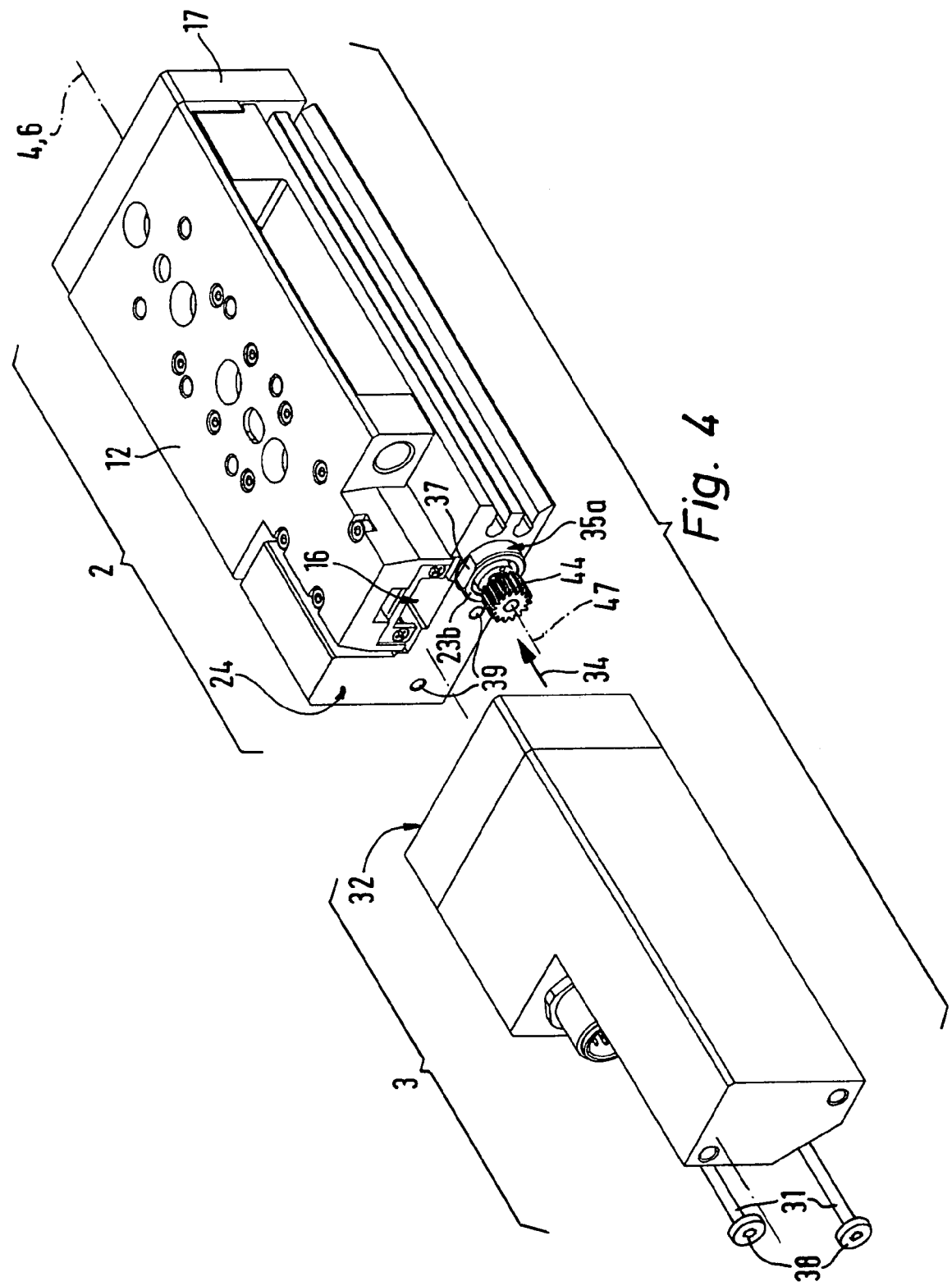

The first transmission gear 44 projects beyond the rear side of the main housing 5 and is also situated upstream of the first plug-type centering means 35a. The second transmission gear 45 is situated in a transmission housing 51 that forms a section of the module housing 33, with the corresponding receptacle space of the transmission housing 51 being accessible via the recess 36. However, a reversed arrangement would also be conceivable. When the motor module 3 is attached to the main housing 5 by effecting the installation motion 34, the first transmission gear 44 penetrates into the transmission housing 51 via the recess 36. During this process, its teeth engage with the teeth of the second transmission gear 45 such that both transmission gears 44, 45 shown in FIG. 3 mesh at one point on their periphery.

This attachment suffices to engage the coupling. This means that the gears are automatically engaged in order to ensure torque transmission when the motor module 3 is attached.

Conversely, the gears are automatically disengaged when the motor module 3 is removed from the main housing 5 in the direction opposite to the installation direction 34.

Since the first transmission gear 44 assumes a consistent or stationary position relative to the main housing 5 independently of the instantaneous relative position between the input part 26 and the output part 27, the motor module 3 can be installed and removed in any such relative position. This means that it is possible, for example, to replace the motor module 3 in case of a defect without having to remove the working unit 2 from its place of installation, so that the instantaneous position of the take-off element 12 is preserved.

A schematically indicated intermediate gear 52 may be arranged in the module housing 33 between the driven part 46 and the second transmission gear 45. This intermediate gear makes it possible to step up or step down the output speed of the electric motor in order to predetermine the rotational speed of the second transmission gear 45 that is dependent on the speed of the electric motor 14. The intermediate gear 52 is preferably realized in the form of a planetary gear. If several motor modules 3 with different intermediate gears 52 are provided, it is possible to realize different step-up or step-down ratios on demand by exchanging the motor module 3.

The second transmission gear 45 is preferably arranged coaxial to the driven part 46 of the electric motor 14. However, if the two transmission gears 44, 45 are arranged laterally offset to one another, it is also possible to accommodate an electric motor 14 with relatively large lateral dimensions in the module housing 33 such that it is still possible for the motor module 3 and the main housing 5 to define an installation surface 53 that lies in a common plane and serves for fixing the linear actuator on a support structure.

The entire spindle drive 8 is preferably realized in the form of a module that can be inserted into and, if so required, removed from the receptacle 7 as a unit. This makes it possible, if so required, to quickly refit the linear actuator, for example, to a spindle drive 8 with a higher or lower thread pitch. In addition, this modular construction allows a particularly simple installation of the entire linear actuator.

The electrical energy and the actuating signals required for operation of the electric motor 14 can be supplied via an electromechanical interface 54 provided on the module housing 33. This interface also makes it possible to read position signals delivered by a not-shown encoder arranged in the module housing 33 that depend on the rotary motion and/or rotational position of the driven part 46 of the electric motor 14. This allows an indirect determination of the position of the take-off element 12 that in the described embodiment is realized in the form of a slide.

The invention claimed is:

1. An electric linear actuator with a main housing having a take-off element supported thereon in a linearly adjustable fashion, wherein said take-off element is coupled to and driven by an output part of a spindle drive arranged in the main housing, and wherein a rotatable input part of said spindle drive is connected to and driven by an electric motor arranged on a rear side of the main housing via a coupling, wherein the coupling comprises a plug-type coupling in the form of a gear transmission comprising a first transmission gear that is connected in a torsionally rigid fashion to the input part of the spindle drive and mounted in a fixed position relative to the main housing, as well as a second transmission gear that is connected to the electric motor, wherein the second transmission gear forms part of a motor module together with the electric motor, and wherein the motor module can be attached to and removed from the rear side of the main housing independently of the instantaneous relative position between the input part and the output part of the spindle drive, and in such a way that the teeth of the two transmission gears are simultaneously engaged or disengaged upon the respective attachment or removal of the motor module, and wherein one of said main housing and said motor module includes a bearing part fixed thereto and projecting outwardly from a mounting face thereof and the other of said main housing and said motor module includes a recess formed in a mounting face thereof, said bearing part being fitted into said recess to center said motor module with respect to said main housing.

2. The linear actuator according to claim 1, wherein the two transmission gears are cylindrical gears, the axes of rotation of which are offset to one another in a parallel fashion and extend in the same direction as an imaginary installation axis along which the motor module is displaced relative to the main housing during its installation and removal.

3. The linear actuator according to claim 2, wherein the installation axis extends in the same direction as the longitudinal axis of the main housing.

4. The linear actuator according to claim 2, wherein the two transmission gears are spur gears.

5. The linear actuator according to claim 1, further comprising cooperating centering means that are associated with the main housing and the motor module and are engaged in the attached state in order to define the position of the two transmission gears relative to one another.

6. The linear actuator according to claim 5, wherein the cooperating centering means are arranged coaxial to the axis of rotation of the first transmission gear.

7. The linear actuator according to claim 5, wherein the cooperating centering means associated with the main housing are formed by a bearing part of the spindle drive that projects beyond the rear side of the main housing and is mounted in a fixed position relative to the main housing.

8. The linear actuator according to claim 1, wherein the motor module can be attached to the main housing in a longitudinally detachable fashion and fixed in the attached position by means of at least one mounting screw.

9. The linear actuator according to claim 1, wherein the motor module comprises a module housing, into which the electric motor is inserted in a removable fashion.

10. The linear actuator according to claim 1, wherein the main housing, the take-off element and the spindle drive are combined into a working unit.

11. The linear actuator according to claim 10, wherein the spindle drive is a module that is removably fixed in a receptacle of the main housing.

12. The linear actuator according to claim 1, wherein the output part of the spindle drive is a nut and the input part is a threaded spindle, the nut being turned on the threaded spindle and is coupled to the take-off element in a motive fashion.

13. The linear actuator according to claim 1, wherein the take-off element comprises a slide that can be adjusted relative to the main housing by means of linear guide means.

14. The linear actuator according to claim 1, wherein the motor module and the main housing define an installation surface that lies in a common plane.

15. An electric linear actuator with a main housing having a take-off element supported thereon in a linearly adjustable fashion, wherein said take-off element is coupled to and driven by an output part of a spindle drive arranged in the main housing, and wherein a rotatable input part of said spindle drive is connected to and driven by an electric motor arranged on a rear side of the main housing via a coupling, wherein the coupling comprises plug-type coupling in the form of a gear transmission comprising a first transmission gear that is connected in a torsionally rigid fashion to the input part of the spindle drive arid mounted in a fixed position relative to the main housing, as well as a second transmission gear that is connected to the electric motor, wherein the second transmission gear forms part of a motor module together with the electric motor, and wherein the motor module can be attached to and removed from the rear side of the main housing independently of the instantaneous relative position between the input part and the output part of the spindle drive, and in such a way that the teeth of the two transmission gears are simultaneously engaged or disengaged upon the respective attachment or removal of the motor module, and wherein the first transmission gear projects beyond the rear side of the main housing and penetrates, when the motor module is attached, into a transmission housing that forms part of the motor module and accommodates the second transmission gear.

16. An electric linear actuator with a main housing having a take-off element supported thereon in a linearly adjustable fashion, wherein said take-off element is coupled to and driven by an output part of a spindle drive arranged in the main housing, and wherein a rotatable input part of said spindle drive is connected to and driven by an electric motor arranged on a rear side of the main housing via a coupling, wherein the coupling comprises a plug-type coupling in the form of a gear transmission comprising a first transmission gear that is connected in a torsionally rigid fashion to the input part of the spindle drive and mounted in a fixed position relative to the main housing, as well as a second transmission gear that is connected to the electric motor, wherein the second transmission gear forms part of a motor module together with the electric motor, and wherein the motor module can be attached to and removed from the rear side of the main housing independently of the instantaneous relative position between the input part and the output part of the spindle drive, and in such a way that the teeth of the two transmission gears are simultaneously engaged or disengaged upon the respective attachment or removal of the motor module, and wherein an intermediate gear in the form of a planetary gear, is arranged in the module housing between the electric motor and the second transmission gear.

17. An electric linear actuator comprising:
a main housing including a take-off element movably supported thereon and a spindle drive disposed therein, said spindle drive having a translatable output part coupled to said take-off element for driving said take-off element, a rotatable input part coupled to said output part and a first transmission gear connected to said input part in a fixed position relative to said main housing; and
a motor module detachably coupled to said main housing, said motor module including a motor and a second transmission gear connected to said motor, wherein said second transmission gear engages said first transmission gear of said spindle drive independent of the instantaneous relative position between said input part and said output part of said spindle drive,
wherein one of said main housing and said motor module includes a bearing part fixed thereto and projecting outwardly from a mounting face thereof and the other of said main housing and said motor module includes a recess formed in a mounting face thereof, said bearing part being fitted into said recess to center said motor module with respect to said main housing.

* * * * *